Oct. 21, 1941.                B. M. HYMAN                2,259,893
                               CORN PICKER
                        Filed Sept. 29, 1939            4 Sheets-Sheet 1

Inventor
Benjamin M. Hyman
By Paul O. Pippel
   Atty.

Oct. 21, 1941.　　B. M. HYMAN　　2,259,893
CORN PICKER
Filed Sept. 29, 1939　　4 Sheets-Sheet 2

Inventor
Benjamin M. Hyman
By Paul O. Pippel
Att'y.

Oct. 21, 1941.  B. M. HYMAN  2,259,893
CORN PICKER
Filed Sept. 29, 1939  4 Sheets-Sheet 4

Inventor
Benjamin M. Hyman
By Paul O. Pippel
Atty.

Patented Oct. 21, 1941

2,259,893

UNITED STATES PATENT OFFICE 2,259,893

CORN PICKER

Benjamin M. Hyman, Moline, Ill., assignor to International Harvester Company, a corporation of New Jersey Application September 29, 1939, Serial No. 297,138

8 Claims. (Cl. 56—18)

This invention relates to a tractor-mounted harvester. More specifically it relates to a tractor-mounted corn picker which is carried upon the tractor by means of framework that may be detached from the tractor and rest on the ground, so as to support the picker detached from the tractor.

In the application of Hyman et al., Serial No. 210,464, filed May 27, 1938, there is shown a corn picker which is supported upon a tractor by means of a framework carried by and beneath the rear axle of the tractor, which framework may be detached from the axle and dropped to the ground so as to form a support for the picker when detached from the tractor. The construction of the framework in the aforementioned application is such that the picker unit has to be raised by means of a jack to permit the tractor to be moved away from the picker unit. The present invention contemplates the provision of a jack as part of the supporting framework for the picker so that no separate jack is required to raise the picker.

An object of the present invention is to provide an improved crop-treating device.

A further object is the provision of an improved tractor-mounted harvester.

Another object is to provide an improved framework for supporting a corn picker upon a tractor.

Still another object is the provision of a framework for supporting a corn picker on a tractor, which framework is capable of supporting the picker unit when detached from the tractor.

According to the present invention, a corn picker is supported in a balanced position over the rear axle of the tractor by means of a framework carried by and beneath the rear axle. The framework is pivotally connected to the picker at a point forward of the rear axle and detachably connected at a point rearward of the rear axle so that it may be detached from the rear axle and dropped to the ground. Jacking means connects a point on the picker unit and a point on the framework so that, when the framework rests on the ground, the rear end of the picking unit may be raised sufficiently to permit the tractor to be backed out of the picker unit.

In the drawings—

Figure 1:
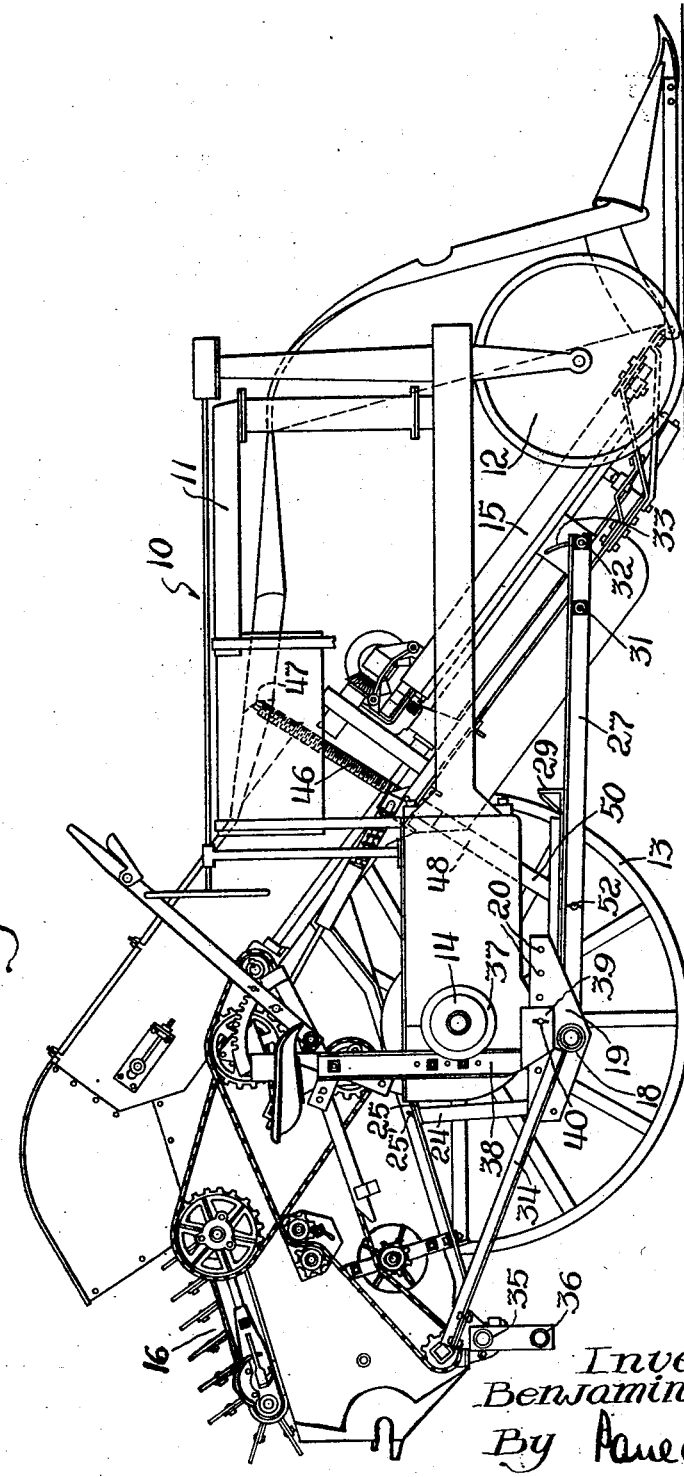
Figure 1 is a side view, showing the attachment of a one-row corn picker to a tractor by means of the improved framework.

A tractor 10 of the tricycle type has a narrow body portion 11, a front truck 12 and rear wheels 13 spaced from the body 11, only one rear wheel being shown. The rear wheels are connected to the body by means of a rear axle 14. A corn picker is positioned over the rear axle 14 of the tractor in balanced relation and comprises a gathering unit 15 and a husking unit 16. A wagon elevator, not shown, completes the picker and is adapted to be carried at the rear of the husking unit. For a more complete showing of the corn picker, attention is directed to the aforementioned application of Hyman et al.

Figure 2:
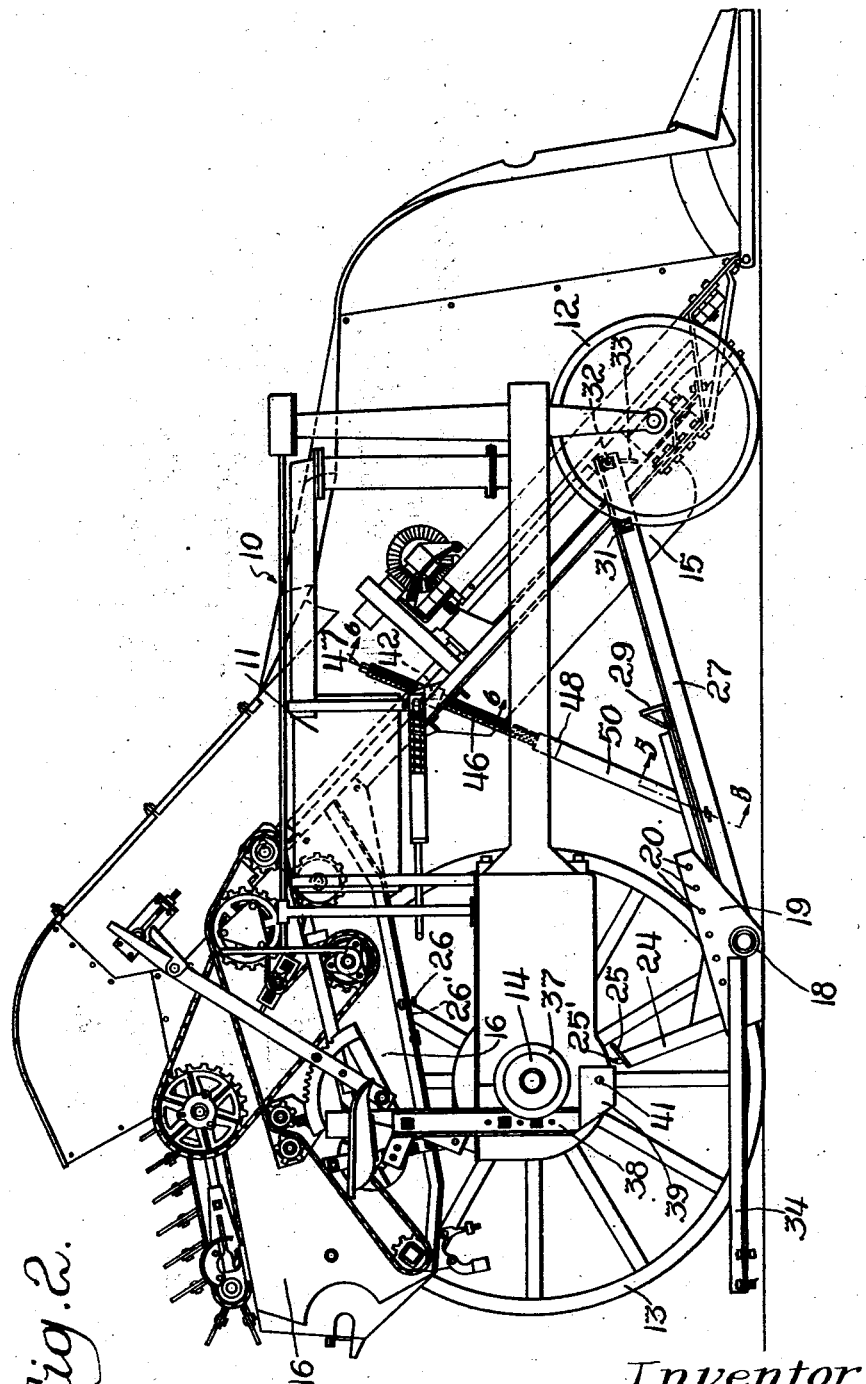
Figure 2 is a similar view, showing the framework detached from the tractor and resting upon the ground and the picker unit elevated so that the tractor may be backed away from it.
Figure 3:
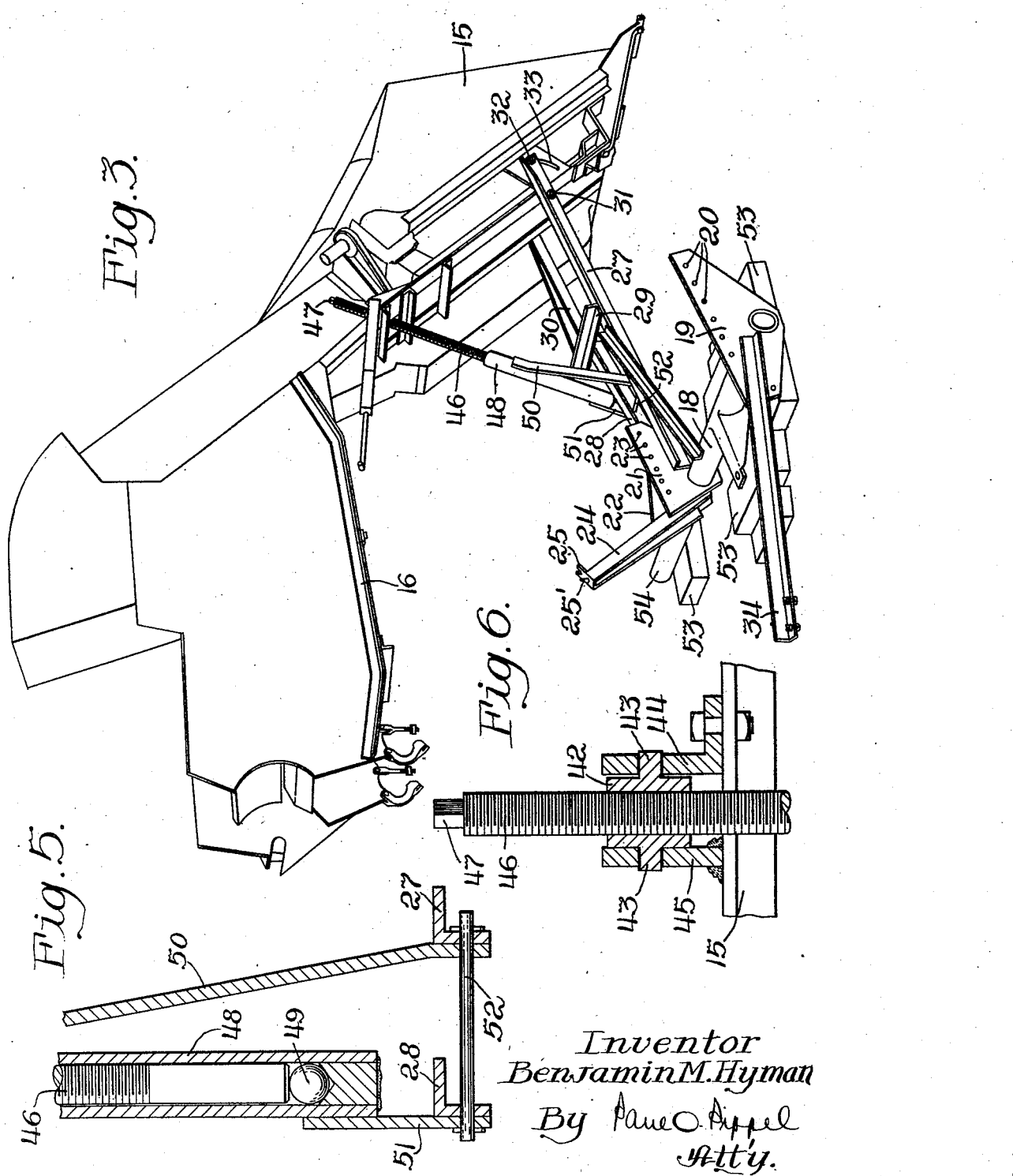
Figure 3 is a perspective view, showing a one-row picker detached from the tractor.

The one-row corn picker is carried on the tractor by means of framework shown best in Figure 3. The framework includes a cross-shaft or transverse pipe 18, at one end of which is welded a gusset plate 19 having a series of holes 20 therein. A pair of gusset plates 21 and 22 are secured in spaced relation adjacent the other end of the pipe 18, the plate 21 having a series of holes 23. A channel member 24 extends rearwardly and upwardly from between the plates 21 and 22 and has at its end a notched plate 25 and a pin 25' adapted to be connected respectively with a pin and recess 26 and 26' on the under side of the husker unit 16 (Figure 2). Angle members 27 and 28 extend forwardly from the plates 21 and 22. A cross brace 29 in the form of an angle member connects the members 27 and 28. A member 30 extends to a connection with the gathering unit as a continuation of the member 28, but in slightly offset relation thereto. The member 27 has a pivotal connection with the gathering unit 15 about the bolt and nut 31. There is also a bolt and nut 32 providing a connection of the angle member 27 in an arcuate slot 33 in the gathering unit 15. An angle member 34 extends rearwardly from the gusset plate 19 and is adapted to support a pair of transverse pipes 35 and 36 (Figure 1). Another member, not shown, is adapted to extend rearwardly from the angle member 34 and form a support for one side of the wagon elevator, not shown, the other side thereof being adapted to be supported on the end of the husker unit. The framework is carried by and beneath the rear axle 14, as shown in Figure 1. The axle 14 has flanges 37, to which a downwardly extending member 38 is attached. The member 38 has a U-shaped portion 39 at its lower end which embraces the gusset plate 19. A pin 40 extends through an opening 41 in the U-shaped part 39 and one of the openings 20 in the gusset plate 19, so as to form a support for one side of the framework. The other side of the framework is similarly supported by means of a downwardly extending member connected to the rear axle and having a U-shaped part embracing the gusset plate 21. The supporting framework thus far described is completely shown in the aforementioned application of Hyman et al. and forms no part of the present invention, except as it cooperates with the novel jacking means to be described presently. The picker unit with its wagon elevator is carried in substantially balanced relation over the rear axle of the tractor by means of the supporting framework.

The jacking means of the present invention consists essentially of an internally threaded trunnion member or nut 42, carried by means of its flanges 43 on members 44 and 45 secured to the under side of the gathering unit 15, and an externally threaded bolt or rod 46 engaging the trunnion member 42. The bolt 46 has a suitable wrench-engaging portion 47 at its upper end and is rotatably mounted in a cup-shaped member 48 and rests against a ball 49 positioned in the base of the cup-shaped member. Members 50 and 51 are secured to the sides of the cup-shaped member 48 and are pivotally connected respectively to the angle members 27 and 28 by means of a pin 52.

The operation of the corn picker is as described in the aforementioned copending application. When it is desired to remove the picker from the tractor, the wagon elevator is removed and then the cross pipes 35 and 36 are removed. A block is placed under the rear end of the husker unit. Then, the pins 40 are removed, the member 24 is disconnected from the husker unit 16, and the framework is allowed to drop to the ground, the cup-shaped member 48 sliding with respect to the rod 46 so that the end of the rod is no longer in contact with the ball 49. Then the rod is screwed in the nut 42 so as to bring the end of the rod again into contact with the ball 49. A member 54 is inserted in one end of the cross pipe 18, as shown in Figure 3, so that the picker unit will have stability in its detached position. The bolt 46 is rotated further so as to raise the rear end of the husker unit 16 to the position shown in Figure 2 in which the lowest point on the husker unit is higher than the rear axle. Then, the tractor is backed away from the picker unit, the front truck 12 passing over the cross pipe 18. The picker unit now rests in the position shown in Figure 3.

Figure 4:
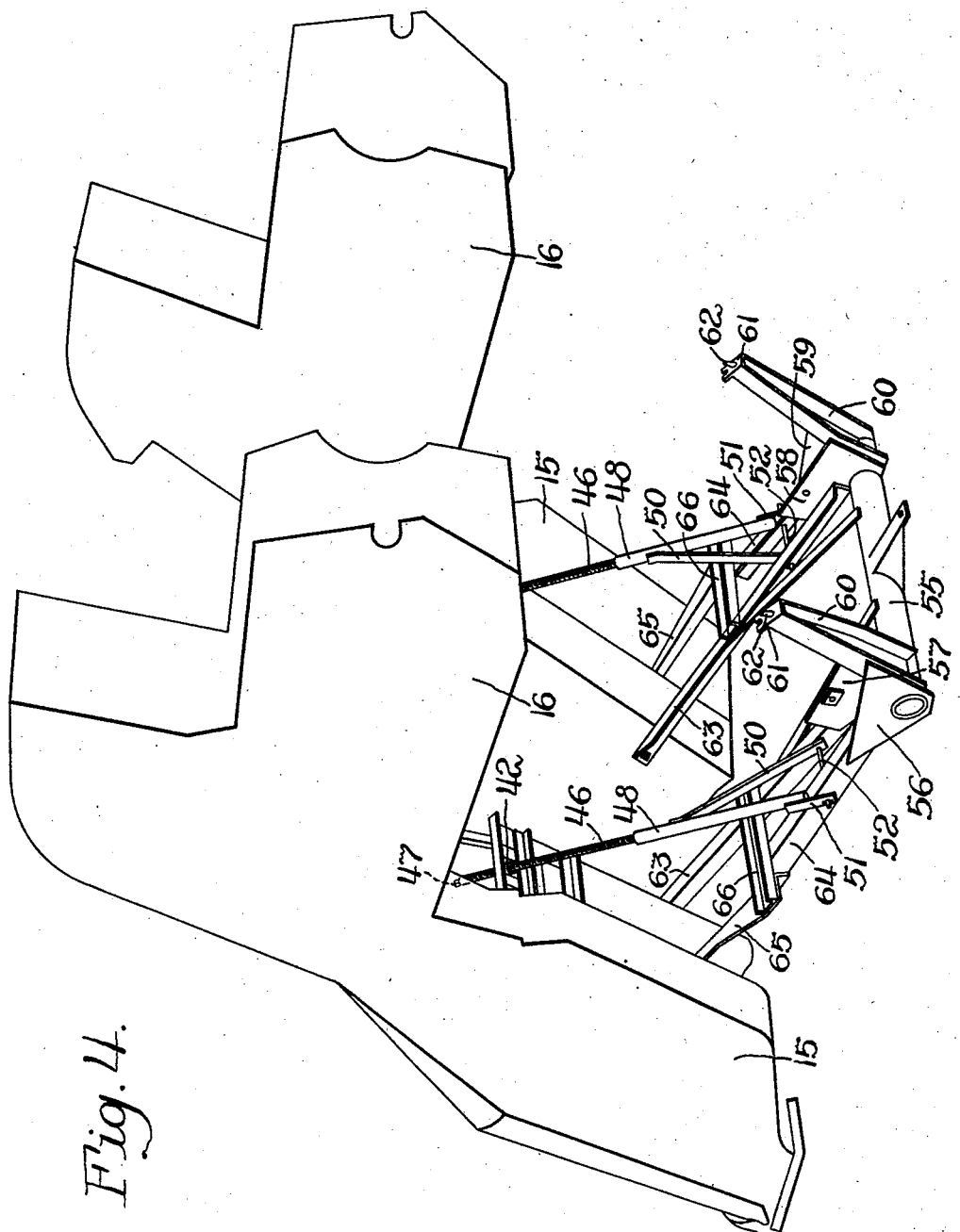
Figure 4 is a perspective view, showing a two-row picker detached from the tractor; and, Figures 5 and 6 are sectional views, showing details of the jacking means forming part of the supporting framework.

Figure 4 shows a two-row corn picker detached from the tractor. Its supporting framework is the same as that shown for a two-row picker in the aforementioned Hyman et al. application and will be referred to only briefly. It comprises essentially a cross pipe 55 having gusset plates 56, 57, 58 and 59 mounted in spaced pairs at each end. A pair of channel members 60 extends rearwardly from between the gusset plates 56 and 57 and the gusset plates 58 and 59 and carries notched end plates 61 and pins 62 adapted to be connected with the under side of the husker unit 16, as described for the one-row model. Angle members 63, 64 and 65 extend from the gusset plates 56, 57, 58 and 59 to the pivotal connections with gathering units 15 in the manner disclosed for the one-row unit. There are channel-shaped cross braces 66 connecting the angle members 63 and 64. There is provided jacking means between the framework and the gathering units as in the one-row model, but in this case there is a jacking means for each picker unit. As in the one-row model, each jacking means comprises an internally threaded trunnion member or nut 42 and a threaded rod or bolt 46 supported in a cup-shaped member 48 secured to members 50 and 51 pivotally secured to the members 63 and 64 by means of a pin 52.

Removal of the two-row picker from the tractor is generally the same as that described for the one-row picker. The wagon elevator, not shown, is removed from its supports on the rear of the husking units 16. Blocks are placed under the ends of the husking units. The gusset plates 57 and 58 are disconnected from U-shaped members carried by the rear axle of the tractor by removal of pins passing through the U-shaped members in the gusset plates, the members 60 are disconnected from the under side of the husking units, and the framework is allowed to drop to the ground. Then, the bolts 46 are turned so as to bring their ends again into contact with the balls in the cup-shaped members 49. Further turning of the bolts raises the rear end of the husking units 16 sufficiently so that the rear axle of the tractor can pass under them. Then, the tractor is backed out and the corn picker is left in its detached position, as shown in Figure 4.

For both the one-row and two-row models, reattachment of the picker to the tractor follows a reversal of the steps of detachment. The tractor is driven into place. The blocks which were employed in the removal of the picker units are again placed under the rear end of the husker units. The bolts 46 are rotated so as to lower the husking units to a position where they rest on the block, and the framework is raised and reattached to the rear axle of the tractor by attachment of the gusset plates to the U-shaped members depending from the tractor rear axle.

It will be understood from the foregoing description that a new and novel supporting means for carrying a picker unit on the tractor has been devised, which includes a jacking means permanently carried by and extending between the gathering unit of the picker and the supporting framework. The supporting means of the present invention makes possible a quick and easy detachment of a picker unit from a tractor upon which it is mounted, as is the case in the aforementioned Hyman et al. application. The jacking means is an improvement over the said application in that it makes possible the elimination of a separate jacking means which is required in the use of the framework of the aforementioned application for raising the picker unit high enough to permit the tractor to be driven away from the picker unit.

The intention is to limit the invention only within the scope of the appended claims.

What is claimed is:

1. In combination, a tractor having an axle, and a frame carried by and below the axle and adapted to be pivotally connected to a crop-treating device at one side of the axle and to be detachably connected to the device at the other side of the axle, said device being adapted to be positioned over the tractor axle with portions extending on both sides of and below the top of the axle, a cup-shaped member secured to the frame at a point on the same side of the axle as the pivotal connection, an externally threaded member rotatably supported within the cup-shaped member and a part secured to the crop-treating device and having a threaded hole engaging the threaded member whereby the frame, detached from the axle and from the portion of the device at one side of the axle, may rest upon the ground and, with the aid of the cup-shaped member, externally threaded member, and part having a threaded hole, may hold the portion of the device at one side of the tractor axle higher than the axle so as to permit the tractor to be moved away from the device.

2. In combination, a tractor having a rear axle, a frame carried by and beneath the rear axle and adapted to have a pivotal connection with a crop-treating device positionable over the rear axle at a point forward of the rear axle and a detachable connection with a point of the device rearward of the rear axle, a pair of members pivotally secured to the frame on a common axis between the rear axle and the pivotal connection of the frame to the crop-treating device, a cup-shaped member secured to the members, a ball resting in the bottom of the cup, an externally threaded member positioned in the cup-shaped member and resting against the ball, and a member secured to the crop-treating device and having a threaded hole receiving the externally threaded member.

3. In combination, a tractor having a narrow body, a narrow wheeled front support and a wide tread rear axle, a supporting frame structure adapted to be pivotally connected to the lower forward end of a picker unit positioned alongside the body of the tractor and extending upwardly over the rear axle, said frame structure extending rearwardly under the rear axle, means for pivotally connecting said frame structure to the rear axle structure for pivotally supporting the picker unit on the tractor, jacking means positioned rearwardly of the pivot point of the picker unit on the frame structure and forwardly of the rear axle and extending between the frame structure and the picker unit so as to lift the rear end of the picker units upwardly when the frame structure is dropped downwardly to the ground for detaching the picker whereby said frame structure forms a support for maintaining the picker units in elevated position to permit backing of the tractor for removal of the picker therefrom.

4. In combination, a tractor having a narrow body and a wide tread rear axle, a supporting frame adapted to be pivotally connected to the lower forward end of a picker unit positioned alongside the body of the tractor and extending upwardly over the rear axle, said supporting frame extending rearwardly under the rear axle, means for pivotally connecting said frame structure to the rear axle structure, means rearward of the pivot point of the picker unit on the frame structure adjustable to lift the rear end of the picker unit upwardly whereby, when the frame structure is dropped downwardly to the ground for detaching the picker, said frame structure forms a support for the picker to maintain the picker unit in elevated position to permit backing of the tractor for removal of the picker therefrom.

5. In combination, a tractor, a supporting means connected beneath the tractor so as to be detachable therefrom to rest upon the ground, the supporting means being connectable with a crop-treating device for supporting the device entirely from the tractor, and jacking means connected with the supporting means and adapted to be connected with the crop-treating device, whereby, when the supporting means is detached from the tractor and rests on the ground, the jacking means may raise the crop-treating device to any elevated position.

6. In combination, a tractor having an axle, and a supporting means adapted to connect the axle and points on a crop-treating device on both sides of the axle for entirely supporting the device in balanced position over the axle with portions thereof below the top of the axle, said means including a part detachable from the axle so as to rest on the ground, and a jacking means connected with the supporting means and adapted to be connected with the crop-treating device, whereby, when the said part of the supporting means is detached from the tractor axle and rests on the ground, the jacking means may raise the portion of the device at one side of the axle higher than the axle so as to allow the tractor to be moved away from the device.

7. In combination, a tractor having a rear axle, a supporting frame extending beneath the rear axle and forwardly and rearwardly thereof, means pivotally detachably connecting the supporting frame to the rear axle, means adapted detachably to connect the supporting frame at one side of the rear axle to one part of a crop-treating device adapted to be positioned over the rear axle and to extend to both sides thereof with the said one part below the top of the axle, and means adapted pivotally to connect the supporting frame at the other side of the rear axle to another portion of the crop-treating device, and jacking means connected with the supporting frame and adapted to be connected with the crop-treating device between the axle and the said other end of the crop-treating device whereby the supporting frame may be disconnected from the rear axle and from the said one end of the crop-treating device and may be dropped so as to rest on the ground, and the jacking means may raise the crop-treating device sufficiently to cause the said one part thereof to be higher than the rear axle to make possible the moving of the tractor away from the device and frame.

8. A unit adapted for attachment to a tractor, comprising a harvesting device, having a first portion and a second portion extending at a substantial angle from the first portion, a first long supporting member pivotally attached at one end to a point on the first portion of the unit spaced from the second portion, a second short supporting member extending from a rigid connection with the other end of the first supporting member and adapted to be connected with the second portion of the harvesting device, means for forming a connection to a tractor at the connection of the first and second supporting members, and jacking means connecting the first portion of the harvesting device and the first supporting member at points spaced from the pivotal connection of the first supporting member and the harvesting device for sustaining the harvesting device.

BENJAMIN M. HYMAN.